(12) United States Patent
Sazuka et al.

(10) Patent No.: US 9,227,554 B2
(45) Date of Patent: Jan. 5, 2016

(54) VEHICULAR LAMP

(71) Applicant: KOITO MANUFACTURING CO., LTD., Tokyo (JP)

(72) Inventors: Kiyoshi Sazuka, Shizuoka (JP); Yasuyuki Kato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 325 days.

(21) Appl. No.: 13/709,192

(22) Filed: Dec. 10, 2012

(65) Prior Publication Data

US 2013/0163266 A1 Jun. 27, 2013

(30) Foreign Application Priority Data

Dec. 27, 2011 (JP) ................................. 2011-286911

(51) Int. Cl.
*F21V 19/02* (2006.01)
*F21V 21/14* (2006.01)
*B60Q 1/06* (2006.01)
*B60Q 1/068* (2006.01)

(52) U.S. Cl.
CPC ............... *B60Q 1/06* (2013.01); *B60Q 1/0683* (2013.01)

(58) Field of Classification Search
CPC ......... B60Q 1/068; B60Q 1/06; B60Q 1/0683
USPC .......... 362/532, 547, 528, 523, 516, 418, 421
See application file for complete search history.

(56) References Cited

U.S. PATENT DOCUMENTS

| 4,831,502 | A  | * | 5/1989  | Fujino et al. ................... | 362/518 |
| 6,231,222 | B1 | * | 5/2001  | Daumueller et al. .......... | 362/524 |
| 7,325,955 | B2 | * | 2/2008  | Lucas et al. .................... | 362/545 |
| 7,481,561 | B2 | * | 1/2009  | Okuda ............................ | 362/539 |
| 7,635,211 | B2 | * | 12/2009 | Kusagaya ...................... | 362/526 |
| 7,766,524 | B2 | * | 8/2010  | Naganawa et al. ............ | 362/544 |

FOREIGN PATENT DOCUMENTS

| JP | 2004311224   | 11/2004 |
| JP | 2009-230940 A | 10/2009 |

OTHER PUBLICATIONS

An Office Action dated Jul. 28, 2015, issued from the Japan Patent Office (JPO) of Japanese Patent Application No. 2011-286911 and an English translation thereof.

* cited by examiner

*Primary Examiner* — Jason Moon Han
(74) *Attorney, Agent, or Firm* — Abelman, Frayne & Schwab

(57) ABSTRACT

A vehicular lamp includes a lamp body having an opening opened in the front side of the lamp; a cover that covers the opening; an irradiation unit mounted inside a lamp chamber formed by the lamp body and the cover, and configured to irradiate light emitted from a light source to the front side of the lamp; a rotation mechanism provided with a shaft portion installed on one of the irradiation unit and the lamp body and extending in a horizontal direction, and a bearing portion installed on the other and configured to support the shaft portion, the rotation mechanism being configured to enable the irradiation unit to rotate about a horizontal axis with regard to the lamp body; and a positioning mechanism configured to position the irradiation unit at a predetermined position within a range of possible rotation about the horizontal axis.

4 Claims, 4 Drawing Sheets

VEHICULAR LAMP

CROSS-REFERENCE TO RELATED APPLICATIONS

This application is based on and claims priority from Japanese Patent Application No. 2011-286911, filed on Dec. 27, 2011, with the Japanese Patent Office, the disclosure of which is incorporated herein in its entirety by reference.

TECHNICAL FIELD

The present disclosure relates to a vehicular lamp, and specifically, to a vehicular lamp having an irradiation unit mounted inside a lamp chamber, which is formed by a lamp body and a cover, and configured to irradiate light from a light source towards the front side of the lamp.

BACKGROUND

Many vehicular lamps, such as vehicular headlights and fog lamps, have an irradiation unit which includes, for example, a light source such as an LED or a bulb, and a reflector. The irradiation unit is arranged inside a lamp chamber formed by a lamp body and a cover, and an aiming adjustment mechanism is provided for adjusting the optical axis of the irradiation unit with respect to the vehicle body. See, for example, Japanese Patent Laid-Open No. 2004-311224. The aiming adjustment mechanism is typically configured such that the front ends of a plurality of aiming adjustment screws protruded from the lamp body are fitted or screw-coupled to a support seat provided on the irradiation unit. Furthermore, the aiming adjustment mechanism is also configured to support the irradiation unit in most of cases.

SUMMARY

However, the vehicular lamp configured such that the irradiation unit inside the lamp chamber is supported by the aiming adjustment mechanism, has a problem that the weight of the irradiation unit may bend the aiming adjustment screws, and as a result, the optical axis may be deviated from the adjusted position.

The present disclosure provides a vehicular lamp including a lamp body having an opening towards a front of the lamp; a cover configured to cover the opening; an irradiation unit mounted inside a lamp chamber formed by the lamp body and the cover, and configured to illuminate light from a light source towards the front side of the lamp; a rotation mechanism provided with a shaft portion installed in one of the irradiation unit and the lamp body and extending in a horizontal direction, and a bearing portion installed in the other of the irradiation unit and the lamp body, configured to support the shaft portion, and configured to enable the irradiation unit to rotate about a horizontal axis with respect to the lamp body; and a positioning mechanism configured to position the irradiation unit in a predetermined position within a range of possible rotation about the horizontal axis.

The vehicular lamp according to the present disclosure employs a rotation mechanism having a shaft portion and a bearing portion that supports the shaft portion, to support the irradiation unit on the lamp body. As a result, compared with a case of employing aiming adjustment screws to support the irradiation unit, for example, the optical axis of the irradiation unit does not easily deviate from the adjusted position due to the weight of the irradiation unit. Furthermore, the rotation mechanism enables the irradiation unit to rotate about the horizontal axis with respect to the lamp body so that the optical axis can be aimed in the upward/downward direction by a simple configuration formed with the rotation mechanism and the positioning mechanism. In addition, in the lamp requiring no aiming of the optical axis in the leftward/rightward direction, it is unnecessary to provide aiming adjustment screws for aiming adjustment in the leftward/rightward direction, and, as a result, the number of components may be reduced and the assembly process may be simplified with the configuration of the present invention.

Also, one of the shaft portion and the bearing portion of the vehicular lamp may be provided on the lamp body or on a bracket mounted on the lamp body.

Accordingly, the rotation mechanism of the present disclosure may be applied without changing the design of the lamp body by using a bracket that can be mounted on a common mounting portion provided on the lamp body.

The irradiation unit of the vehicular lamp described above has a reflection member configured to reflect light from the light source towards the front side of the lamp, and the other of the shaft portion and the bearing portion may be formed integrally with the reflection member.

Accordingly, the number of components needed by the rotation mechanism may be reduced further.

The irradiation unit of the vehicular lamp includes a semiconductor light-emitting element as a light source, and a heat sink configured to radiate the heat generated from the semiconductor light-emitting element. The other of the shaft portion and the bearing portion may be installed on an engagement member mounted on the heat sink.

Accordingly, although the weight of the irradiation unit may increase when the heat sink is made of metal, the optical axis of the irradiation unit does not easily deviate from the adjusted position, because the irradiation unit is supported by a rotation mechanism, which has a higher level of rigidity compared with aiming adjustment screws.

Moreover, the rotation mechanism may be installed above the position of the center of gravity of the irradiation unit, and the positioning mechanism may be installed below the rotation mechanism.

Accordingly, since the rotation mechanism is installed above the position of the center of gravity of the irradiation unit, when the positioning mechanism installed below the rotation mechanism is constituted with an aiming adjustment screw protruding from the lamp body and a support portion with which the front end of the aiming adjustment screw contacts, for example, a moment is generated in a direction that the front end of the aiming adjustment screw and the support portion are forced against each other even in a positioned state. As a result, the aiming adjustment screw and the support portion may maintain a stable contact state.

In addition, the present disclosure does not only include respective features described above, but also any sub-combination of such features.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Figure 1:
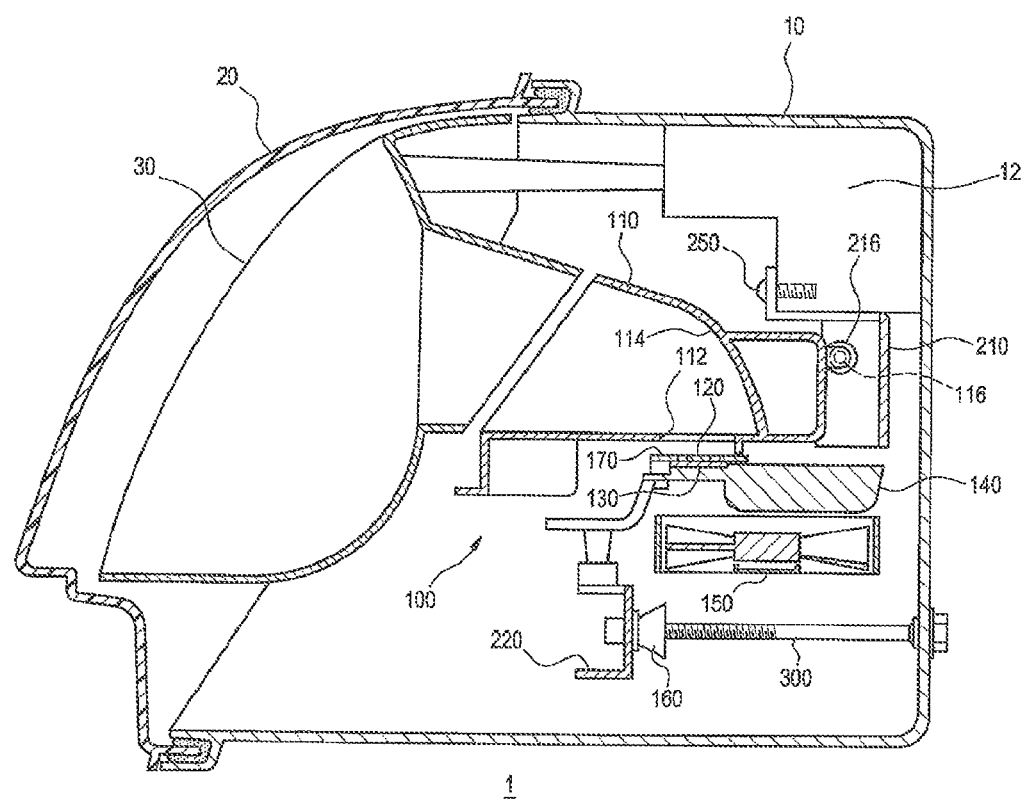
FIG. 1 is a longitudinal sectional view of a vehicular lamp according to a first embodiment of the present disclosure.
Figure 2:
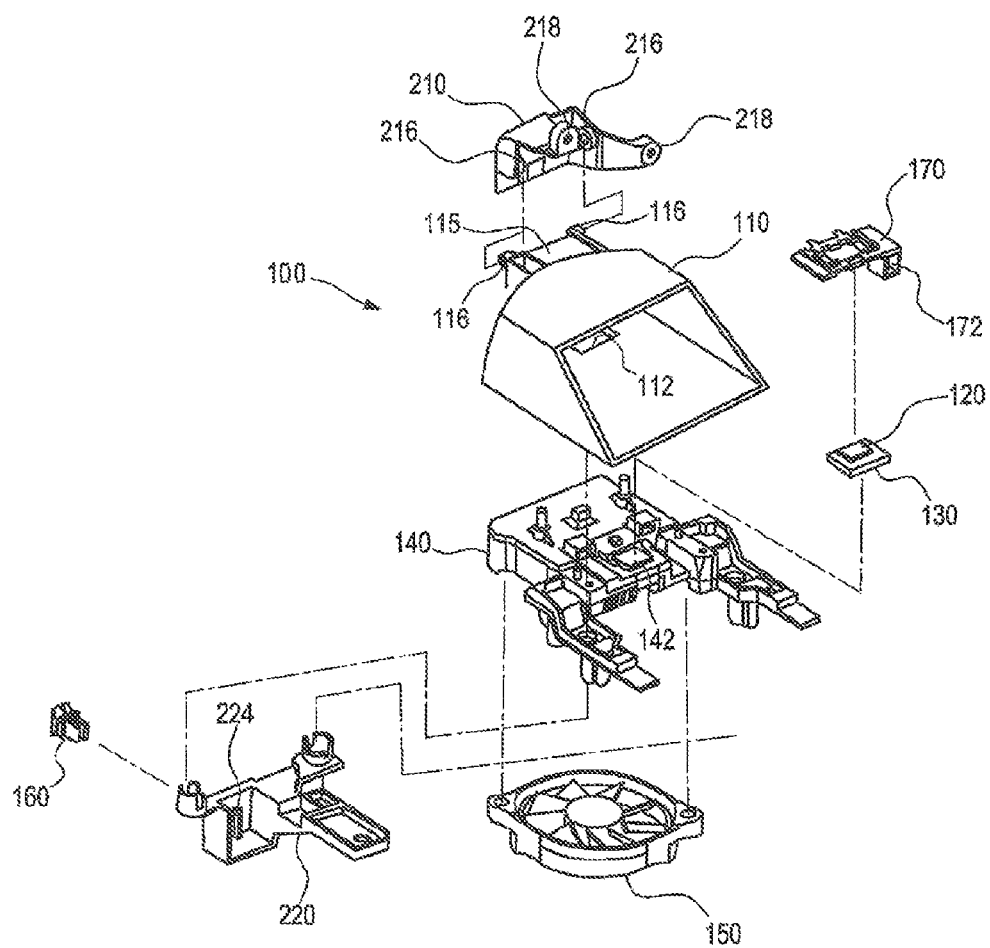
FIG. 2 is an exploded perspective view illustrating respective components constituting an irradiation unit of the vehicular lamp according to the first embodiment of the present disclosure.

Hereinafter, exemplary embodiments of the present disclosure will be described with reference to the accompanying drawings. FIG. 1 is a longitudinal sectional view of a vehicular lamp 1 according to a first embodiment of the present disclosure. FIG. 2 is an exploded perspective view illustrating respective components constituting an irradiation unit 100.

The vehicular lamp 1 according to the present embodiment is used as a headlamp or a fog lamp of a passenger car, as an example. Therefore, it is assumed in the following description that "the front side of the lamp" refers to approximately the same direction as "the front side of the vehicle", and "the rear side of the lamp" similarly refers to approximately the same direction as "the rear side of the vehicle".

As illustrated in FIG. 1, the vehicular lamp 1 includes a lamp body 10, and a transparent cover 20 mounted on the lamp body 10 so as to cover an opening formed on a part of the lamp body 10 near the front side of the lamp. The vehicular lamp 1 also includes an irradiation unit 100 mounted inside a lamp chamber formed by the lamp body 10 and the cover 20, an extension 30 arranged to surround the peripheral portion of the irradiation unit 100 inside the lamp chamber, and an adjustment screw 300 mounted on a surface of the lamp body 10 near the rear side of the lamp.

As illustrated in FIGS. 1 and 2, the irradiation unit 100 has a reflector 110, an LED 120, a substrate 130, a heat sink 140, a fan 150, a self-locking nut 160, an attachment 170, a first bracket 210, and a second bracket 220.

The LED 120 is an example of a semiconductor light-emitting element serving as a light source of the vehicular lamp 1, and is mounted at the center of the upper surface of the substrate 130 on which a lighting circuit is formed. Furthermore, the substrate 130 is mounted on an LED mounting portion 142 provided on the upper surface of the heat sink 140 by the attachment 170 so that the light-emitting surface of the LED 120 faces upwards. The attachment 170 is provided with a connector 172 to connect with an external power source (not illustrated), and is also provided with a contact terminal to make a contact with an electrode installed on a surface of the substrate 130. The LED 120 receives power from the external power source via the attachment 170 and the substrate 130 to emit light.

The heat sink 140 is configured to efficiently radiate the heat generated from the LED 120 and the substrate 130 while the LED 120 is turned ON. Therefore, the heat sink 140 is made of a metallic material such as aluminum having an excellent heat conductivity, and is provided with a plurality of radiating fins (not illustrated) arranged at an interval at least on the lower surface thereof And a fan 150 is attached to the bottom of the heat sink 140. The fan 150 is configured to convect air inside the lamp chamber so that the heat, which has been generated from the LED 120 and the substrate 130 and transferred to the heat sink 140, is dissipated into the air.

The reflector 110 is provided with an opening 112 at the center of the lower surface thereof and is mounted on the upper surface of the heat sink 140 so that the opening 112 exposes the light-emitting surface of the LED 120. Light from the light-emitting surface of the LED 120 passes through the opening 112, and the reflection surface 114 of the reflector 110 reflects the light towards the front of the lamp.

The reflector 110 is provided with a pair of cylindrical shaft portions 116 protruding in the horizontal direction at the rear side of the lamp. More specifically, a support portion 115 is formed at the rear portion of the reflector 110 on which the reflection surface 114 is formed, so as to protrude towards the rear side of the lamp, and the shaft portions 116 protrude from the support portion 115 in the horizontal direction towards both sides of the reflector 110. The pair of shaft portions 116 are rotatably fitted to bearing portions 216 (to be described later) provided on the first bracket 210 to form a part of a rotation mechanism which enables the irradiation unit 100 to rotate about the horizontal axis with respect to the lamp body 10.

The second bracket 220 is a component obtained by, for example, an injection-molding of a resin material and is screw-fixed in front of the fan 150 at the beneath of the heat sink 140. As illustrated in FIG. 2, a self-locking nut mounting hole 224 extends through the second bracket 220 in the forward/backward direction of the lamp, and a self-locking nut 160 is mounted in the self-locking nut mounting hole 224.

The self-locking nut 160 is formed with a concavity indented from the rear side of the lamp to the front side of the lamp. When the irradiation unit 100 is mounted on the lamp body 10, as illustrated in FIG. 1, the front end of the adjusting screw 300 mounted on the lamp body 10 is screw-coupled to the concavity of the self-locking nut 160.

The first bracket 210 is a component obtained by, for example, an injection-molding of a resin material, as in the second bracket 220. Two screw holes 218 extend through the first bracket 210 in the forward/backward direction of the lamp, and the first bracket 210 is screw-fixed near the lamp chamber by screws 250 to a surface of the bracket mounting portion 12, which is formed to protrude from a wall of the lamp body 10 to the front near the rear side of the lamp. The first bracket 210 is provided with a pair of bearing portions 216. The pair of bearing portions 216 are approximately cylindrical concavities, which are indented in the horizontal direction, as illustrated in FIG. 2, and the open surfaces of the bearing portions 216 face each other.

As illustrated in FIG. 1, the shaft portions 116 provided on a part of the reflector 110 near the back of the lamp are rotatably fitted into each of the bearing portions 216 of the first bracket 210. Therefore, respective centers in the horizontal direction of the shaft portions 116 of the reflector 110 and of the bearing portions 216 of the first bracket 210 are joined by a single horizontal axis. As a result, the irradiation unit 100 including the reflector 110 and other components connected to the reflector 110 is configured to be rotatable about the horizontal axis which extends through the center of the shaft portions 116 and the bearing portions 216 with respect to the lamp body 10.

The adjustment screw 300 is an example of the positioning mechanism configured to position the irradiation unit 100 in a predetermined position within a range of possible rotation about the horizontal axis, and the front end thereof is fitted into the concavity of the self-locking nut 160, as described above. When the position of the optical axis of the irradiation unit 100 needs to be adjusted in the upward/downward direction, the nut, which is on a part of the lamp body 10 near the rear side of the lamp, is turned so that the screw body of the adjusting screw 300 that extends into the lamp chamber, is rotated.

Then, as the self-locking nut 160 is moved in the front and rear direction of the lamp by the rotation of the adjustment screw 300, the irradiation unit 100 rotates about the horizontal axis. In this case, the adjusting screw 300 may be locked at the position where the nut has stopped rotating. Therefore, the irradiation unit 100 may be positioned in a specific position within the range of possible rotation by the adjusting screw 300.

As described above, the irradiation unit 100 is supported on the lamp body 10 (more precisely, on the first bracket 210 fixed to the lamp body 10) through the rotation mechanism constituted with the shaft portion 116 provided on the reflector 110 and the bearing portion 216 supporting the shaft portion 116 in the vehicular lamp 1 of the present disclosure. Therefore, as compared with a case where the irradiation unit 100 is supported by aiming adjustment screws, the optical axis of the irradiation unit 100 does not easily deviate from the adjusted position by the weight of the irradiation unit 100, including the heat sink 140 made of a metallic material.

In addition, the optical axis of the irradiation unit 100 can be aimed vertically in the upward/downward direction by a simple configuration formed by the rotation mechanism and the adjusting screw 300. Furthermore, when the vehicular lamp 1 does not require an aiming of the optical axis of the irradiation unit 100 in the leftward/rightward direction, it is unnecessary to provide aiming adjustment screws for aiming adjustment in the leftward/rightward direction. Therefore, when the configuration described above is adopted, the number of components may be reduced and the assembly process may be simplified.

In addition, because the shaft portions 116 of the rotation mechanism are integrated with the reflector 110 in this example, the number of components may be reduced. Furthermore, the bearing portions 216 of the rotation mechanism are not directly installed on the lamp body 10, but are installed on the first bracket 210 mounted on the lamp body 10. Therefore, even if the position of the rotation mechanism is changed due to the design of the irradiation unit 100, such change may be accommodated by modifying the design of the first bracket 210 alone.

As illustrated in FIG. 1, the rotation mechanism is installed above the position of the center of gravity of the irradiation unit 100 in the present example, and the adjustment screw 300 is installed below the rotation mechanism. As a result, a moment is generated in the direction where the self-locking nut 160 is forced against the front end of the adjustment screw 300 in the irradiation unit 100. Therefore, the adjustment screw 300 and the self-locking nut 160, which is the illumination unit side support portion, may be able to maintain a stable contact state.

Figure 3:
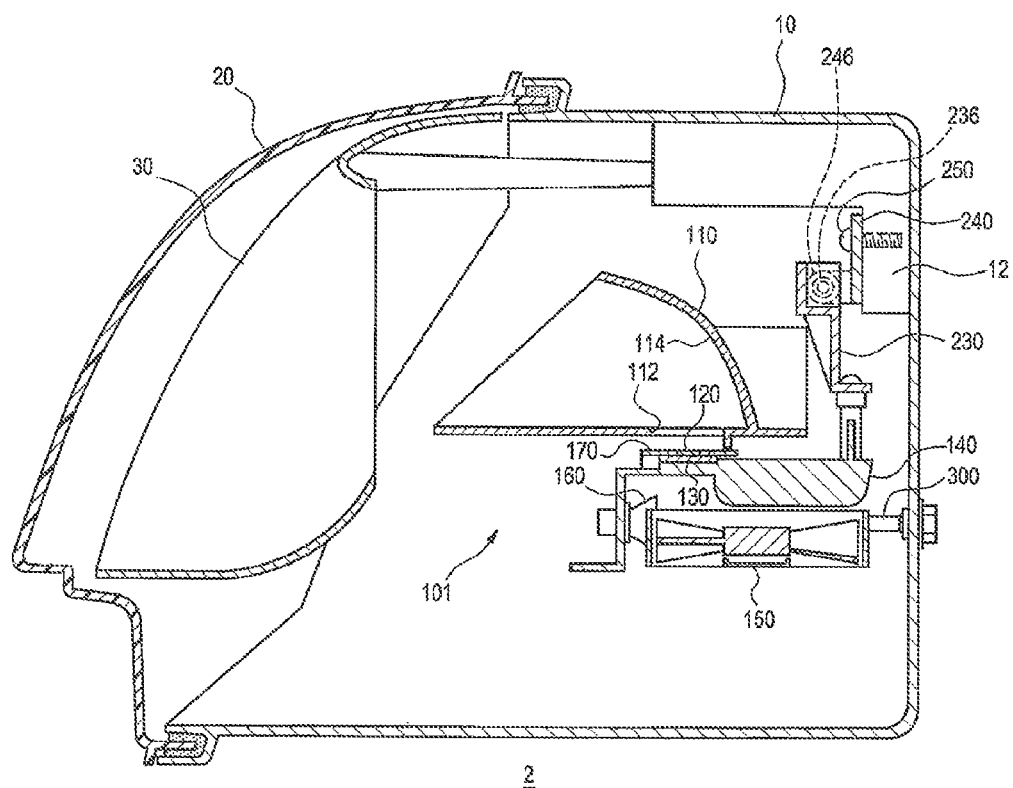
FIG. 3 is a longitudinal sectional view of a vehicular lamp according to a second embodiment of the present disclosure.
Figure 4:
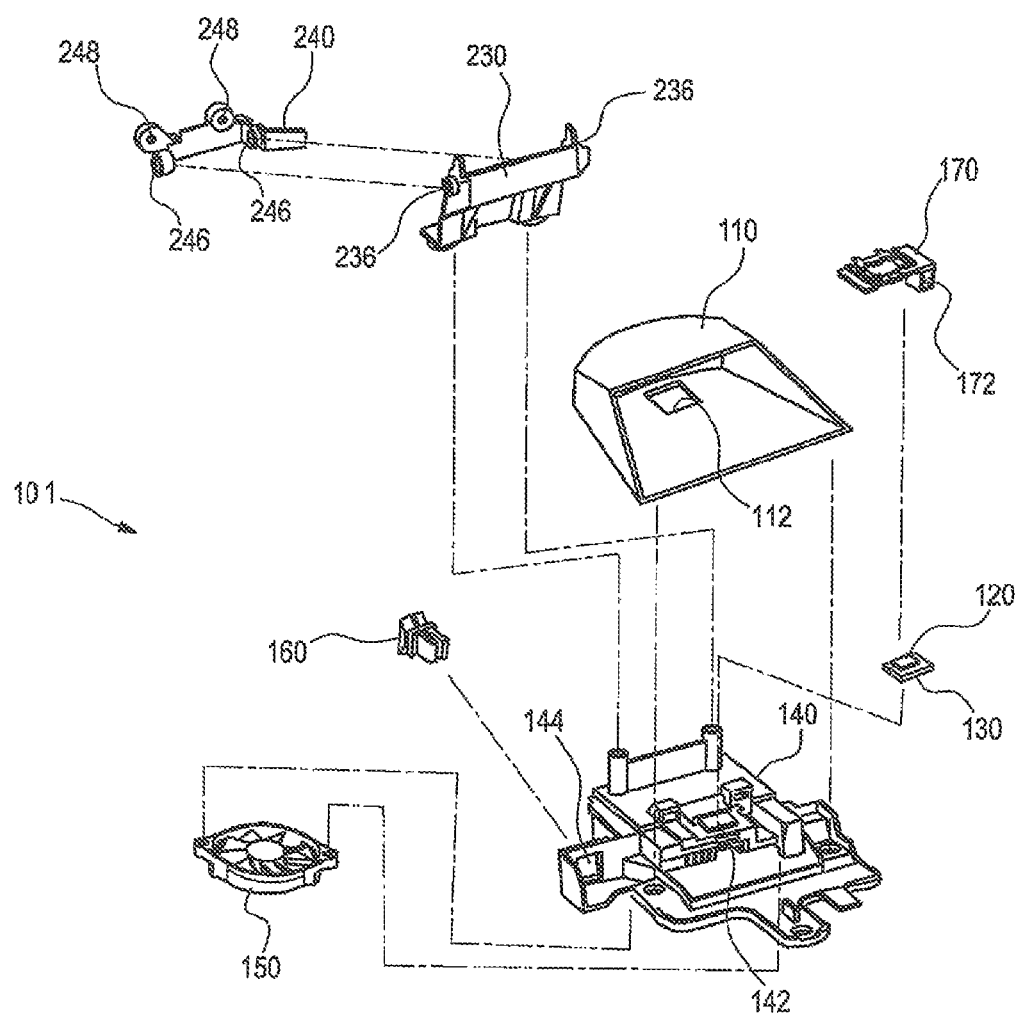
FIG. 4 is an exploded perspective view illustrating respective components constituting an irradiation unit of the vehicular lamp according to the second embodiment of the present disclosure.

FIG. 3 is a longitudinal sectional view of a vehicular lamp 2 according to a second exemplary embodiment of the present disclosure. In addition, FIG. 4 is an exploded perspective view illustrating respective components constituting an irradiation unit 101. Among respective components constituting the vehicular lamp 2 according to the present embodiment, the component having the same configuration as those of the vehicular lamp 1 according to the first exemplary embodiment will be given the same reference numerals, and the descriptions thereof will be omitted for clarity.

The vehicular lamp 2, as illustrated in FIG. 3, includes a lamp body 10, a cover 20, an extension 30, and an irradiation unit 101. Among them, the lamp body 10, the cover 20, and the extension 30 have the same functions and configurations as in the case of the corresponding components of the vehicular lamp 1, and the descriptions thereof will be omitted.

As illustrated in FIGS. 3 and 4, the illumination unit includes a reflector 110, an LED 120, a substrate 130, a heat sink 140, a fan 150, a self-locking nut 160, an attachment 170, a first bracket 230, and a second bracket 240. Among these components, only the components different from respective components of the irradiation unit 100 of the vehicular lamp 1 will be described.

In the present example, as illustrated in FIG. 4, the heat sink 140 is provided with a self-locking nut mounting hole 144 and is mounted with the self-locking nut 160. In addition, the first bracket 230 is an example of an engagement member according to the present disclosure, and is fixed to the heat sink 140 by using an adhesion or a screwing, as for an example. A pair of cylindrical shaft portions 236 protruding in the horizontal direction are provided in both lateral surfaces of the first bracket 230.

The pair of shaft portions 236 are installed in opposite positions on both lateral surfaces of the first bracket 230 so that the central axes of the pair of shaft portions 236 are joined by a single horizontal axis, and are rotatably fitted in bearing portions 246 (described later) provided on the second bracket 240, as illustrated in FIG. 4, thereby forming a part of a rotation mechanism configured to enable the irradiation unit 101 to rotate about the horizontal axis with respect to the lamp body 10.

The second bracket 240 is provided with two screw holes 248 extending through the second bracket 240 in the front/rear direction of the lamp, and is screw-fixed by screws 250 to the lamp chamber side surface in the bracket mounting portion 12, which is formed to protrude from the wall of the lamp body 10 in the rear side of the lamp to the front side. The second bracket 240 is provided with a pair of bearing portions 246. As illustrated in FIG. 4, the pair of bearing portions 246 are approximately cylindrical concavities indented in the horizontal direction in which the center of the open surfaces of the pair of the bearing portions 246 are positioned to be connected by a single horizontal axis, and opposed to each other.

As illustrated in FIG. 3, the shaft portions 236 provided on both lateral surfaces of the first bracket 230 are rotatably fitted in the bearing portions 246 of the second bracket 240, respectively. The irradiation unit 101 is configured to rotate about the horizontal axis, which passes through the center of the shaft portions 236 and the bearing portions 246 in the horizontal direction, with respect to the lamp body 10.

The vehicular lamp 2 configured as described above has the following features in addition to the same features of the vehicular lamp 1 described above: the shaft portions 236 and the bearing portions 246 constituting the rotation mechanism are provided as single components (first bracket 230 and second bracket 240), respectively. Therefore, even if the design of the lamp body 10 or any other component of the irradiation unit 101 is modified, the first bracket 230 and the second bracket 240 may be used as they are for the lamp body 10 or the irradiation unit 101, the design of which has been modified.

Although exemplary embodiments of the present disclosure have been described above, the technical scope of the present disclosure is not limited to the scope described in connection with the embodiments. It is obvious to those skilled in the art that various modifications or improvements can be made to the embodiments described above.

For example, the positioning of the rotation mechanism with regard to the vehicular lamp 1 or 2 is not limited to the examples of the embodiments described above, as long as the irradiation unit 100 or 101 can be rotated with respect to the lamp body 10 and can be positioned by the adjustment screw 300. Furthermore, the respective shapes of the shaft portions 116 or 236 and the bearing portions 216 or 246, which constitute the rotation mechanism, are not limited to the exemplary embodiments described above, as long as each of the shaft portions 116 or 236 and the bearing portions 216 or 246 has the same functions.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
   a lamp body having an opening formed at a front side of the lamp;
   a cover configured to cover the opening;
   an irradiation unit mounted inside a lamp chamber formed by the lamp body and the cover, and configured to irradiate light emitted from a light source to the front side of the lamp;
   a rotation mechanism provided with a shaft portion installed on one of the irradiation unit and the lamp body and longitudinally extending in a horizontal direction perpendicular to the light irradiated from the light source to the front side of the lamp, and a bearing portion installed on the other of the irradiation unit and the lamp body and configured to support the shaft portion, the rotation mechanism being configured to enable the irradiation unit to rotate with respect to a horizontal axis of the shaft portion; and
   a positioning mechanism configured to position the irradiation unit at a predetermined position within a range of possible rotation about the horizontal axis,
   wherein one of the shaft portion and the bearing portion of the rotation mechanism is installed on a bracket mounted on the lamp body.

2. The vehicular lamp of claim 1, wherein the irradiation unit has a reflection member configured to reflect light from the light source to the front side of the lamp, and the other of the shaft portion and the bearing portion is formed integrally with the reflection member.

3. The vehicular lamp of claim 1, wherein the irradiation unit includes a semiconductor light-emitting element serving as the light source, and a heat sink configured to dissipate heat generated from the semiconductor light-emitting element, and the other of the shaft portion and the bearing portion is installed on an engagement member mounted on the heat sink.

4. The vehicular lamp of claim 1, wherein the rotation mechanism is installed above a position of center of gravity of the irradiation unit, and the positioning mechanism is installed below the rotation mechanism.

* * * * *